(12) United States Patent
Zingelmann et al.

(10) Patent No.: US 9,175,732 B2
(45) Date of Patent: Nov. 3, 2015

(54) VARIABLE SPEED TRANSMISSION CLUTCH LINKAGE

(75) Inventors: Christopher Kurt Zingelmann, Carrboro, NC (US); Christopher Todd Walker, Hillsborough, NC (US); Tsuyoshi Yoshigasaki, Durham, NC (US); Brian Bender, Mebane, NC (US); Yasumi Fukuzumi, Durham, NC (US)

(73) Assignee: Honda Motor Co., Ltd., Tokyo (JP)

( * ) Notice: Subject to any disclaimer, the term of this patent is extended or adjusted under 35 U.S.C. 154(b) by 849 days.

(21) Appl. No.: 12/786,917

(22) Filed: May 25, 2010

(65) Prior Publication Data

US 2011/0290613 A1 Dec. 1, 2011

(51) Int. Cl.
*F16D 23/12* (2006.01)
*F16D 23/14* (2006.01)

(52) U.S. Cl.
CPC .......... *F16D 23/12* (2013.01); *F16D 2023/141* (2013.01)

(58) Field of Classification Search
CPC ............................ F16D 2023/141; F16D 23/12
USPC ............................ 74/473.37; 192/99 R, 99 A
See application file for complete search history.

(56) References Cited

U.S. PATENT DOCUMENTS

| 115,792 | A | * | 6/1871 | Waldo ........................ 192/70.15 |
| 1,431,053 | A | | 10/1922 | Smith |
| 1,467,681 | A | * | 9/1923 | Peters ........................... 192/99 S |
| 1,545,050 | A | * | 7/1925 | Hansen ........................ 192/69.82 |
| 1,552,368 | A | | 9/1925 | Whitacre |
| 1,609,741 | A | | 12/1926 | Taylor |
| 1,966,100 | A | * | 7/1934 | McAdams et al. ......... 192/56.53 |
| 3,372,782 | A | * | 3/1968 | Nieland ...................... 192/93 R |
| 4,560,052 | A | | 12/1985 | Renaud |
| 4,655,335 | A | * | 4/1987 | Maruyamano et al. ...... 192/99 S |
| 4,708,230 | A | | 11/1987 | Maucher |
| 4,850,467 | A | | 7/1989 | Parzefall |
| 5,353,902 | A | * | 10/1994 | Flowtow et al. ............. 192/84.6 |
| 7,353,929 | B2 | * | 4/2008 | Brunner et al. .............. 192/99 S |
| 7,438,170 | B2 | | 10/2008 | Maier et al. |
| 7,487,696 | B2 | * | 2/2009 | Tagami ........................ 74/665 F |

* cited by examiner

*Primary Examiner* — Terry Chau
(74) *Attorney, Agent, or Firm* — Jenkins, Wilson, Taylor & Hunt, P.A.

(57) ABSTRACT

The present subject matter relates to clutch arm and release devices and methods such as for a variable speed transmission. A clutch linkage can include a control shaft pivotable about an axis, a substantially U-shaped arm connected at two points to the shaft, and a plurality of projections positioned on the arm. The arm can be moved between positions in response to rotational movement of the control shaft, and the projections can thereby engage and exert a force on a movable sleeve to move the sleeve, such as for causing a clutch bearing to move between an engaged and a disengaged position.

17 Claims, 6 Drawing Sheets

VARIABLE SPEED TRANSMISSION CLUTCH LINKAGE

TECHNICAL FIELD

The subject matter disclosed herein relates generally to components of a variable speed transmission. More particularly, the subject matter disclosed herein relates to clutch arm designs and linkages for variable speed transmissions.

BACKGROUND

In one typical kind of clutch engagement/disengagement system, a clutch disengaging unit operates by a sleeve mounted on a guide (e.g., on the output shaft of the transmission). This sleeve can be moved to cause a clutch element to shift between an engaged and disengaged position. For instance, where the clutch element is a friction plate of a plate or disk clutch, movement of the sleeve on the guide can deform a diaphragm spring of the clutch such that pressure plates are disengaged from corresponding friction linings on the clutch disk.

A simple mechanical linkage can serve as the mechanism by which the sleeve is moved to shift the clutch element between the engaged and disengaged positions. Specifically, in one common configuration shown in FIGS. 1 and 2, a clutch linkage 100 can include a control shaft 102 on which two separate arms 104 are attached for pivoting movement with control shaft 102. Each of arms 104 can include an inward-facing protrusion 106 (i.e., facing towards the other of arms 104). Protrusions 106 can engage a sleeve 108 to move sleeve 108 between the engaged and disengaged positions. Specifically, for example, sleeve 108 can include a groove 110 in which protrusions 106 can be disposed or inserted. As a result, when control shaft 102 is rotated, arms 104 move sleeve 108 along a guide 112 to engage or disengage a clutch element 150, such as a pressure plate of a disk clutch.

Although this simple linkage arrangement can be used for transmitting the motion of control shaft 102 to clutch element 150, the effectiveness of such a component can be compromised by certain aspects of the design. For instance, because arms 104 are independently mounted on control shaft 102, small differences in the positions of arms 104 relative to control shaft 102 can exist because of machining tolerances and the precision of assembly and installation of the components. As a result, it is difficult to ensure that both of arms 104 engage their respective protrusions 106 with groove 110 of sleeve 108 at the same instant and to the same extent. This uneven application of force can lead to uneven wear upon clutch linkage 100 and sleeve 108, sleeve 108 can tend to jam or at least offer a very pronounced resistance to axial movement along guide 112, and pressure can be applied unevenly to clutch element 150, which can reduce the operating life of any bearings connected therewith.

These drawbacks can impede the smooth operation of the clutch and reduce the useful life of sleeve 108 and/or guide 112, especially if sleeve 108 is made of a synthetic material (e.g., plastic). Additional drawbacks of such declutching device designs include the initial cost of manufacture of multiple component parts that make up clutch linkage 100, and installation of all of the parts individually can be time consuming. As a result, it would be desirable for a new declutching device that can operate more consistently than current designs without increasing the cost of manufacture or installation.

SUMMARY

In accordance with this disclosure, clutch arm or release devices are provided. In one aspect, a clutch linkage for a variable speed transmission is provided. The clutch linkage can include a control shaft pivotable about an axis, a substantially U-shaped arm connected at two points to the shaft, and a plurality of projections positioned on the arm. The arm can be movable between a first position and a second position in response to pivoting of the control shaft, and the projections can exert a force on a movable sleeve when the substantially U-shaped arm is moved between the first position and the second position.

In another aspect, a clutch arm or release device for a variable speed transmission is provided. The clutch release device can include a sleeve movable between a disengaged position away from a clutch element and an engaged position against the clutch element, a control shaft pivotable about an axis, a substantially U-shaped arm positioned about the sleeve and connected at two points to the shaft, and a plurality of projections positioned on the arm. The projections can link the arm to the sleeve. In this configuration, rotation of the control shaft about the axis moves the arm between a first position and a second position, which in turn moves the sleeve between the disengaged position and the engaged position. In addition, when the arm is moved between the first position and the second position, it can exert a force on the clutch element to move it to an engaged position.

Although some of the aspects of the subject matter disclosed herein have been stated hereinabove, and which are achieved in whole or in part by the presently disclosed subject matter, other aspects will become evident as the description proceeds when taken in connection with the accompanying drawings as best described hereinbelow.

BRIEF DESCRIPTION OF THE DRAWINGS

The features and advantages of the present subject matter will be more readily understood from the following detailed description which should be read in conjunction with the accompanying drawings that are given merely by way of explanatory and non-limiting example, and in which.

DETAILED DESCRIPTION

The present subject matter provides clutch release devices and methods such as for variable speed transmission systems, such as lawnmowers or any other suitable machine for example. In one aspect, the present subject matter provides a clutch linkage in which a single, substantially U-shaped clutch arm is attached to a rotatable control shaft. The single clutch arm can operate in a similar manner to the system having two separate arms to engage a clutch bearing, but because only a single component is needed to make the multiple points of connection, the improved design can provide efficiency and reduce cost in both part manufacturing and assembly.

Figure 3:
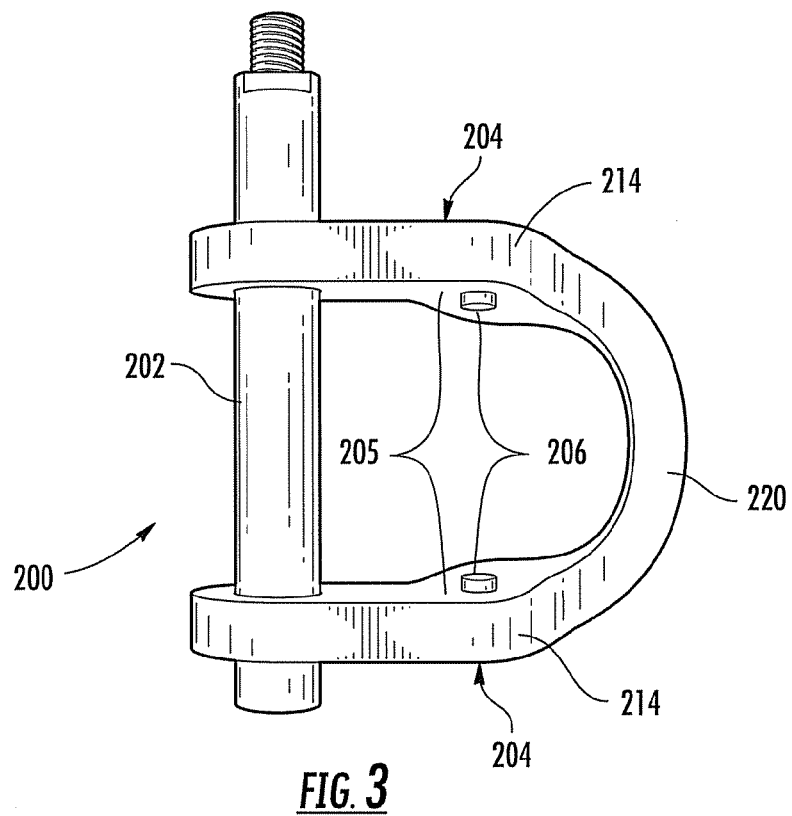
FIG. 3 is a top view of a clutch linkage according to an embodiment of the presently disclosed subject matter.
Figure 4:
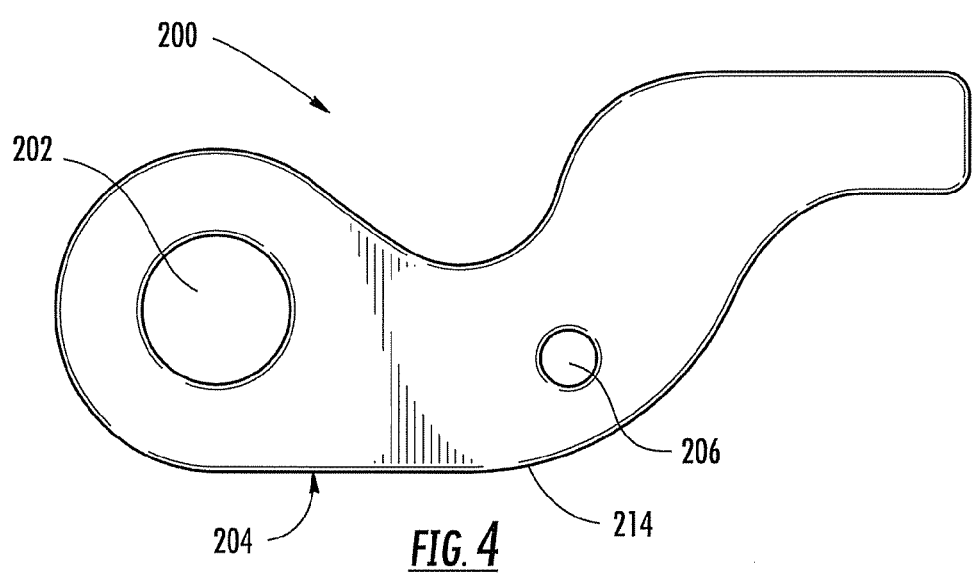
FIG. 4 is a side view of one arm of a clutch linkage according to an embodiment of the presently disclosed subject matter.
Figure 5:
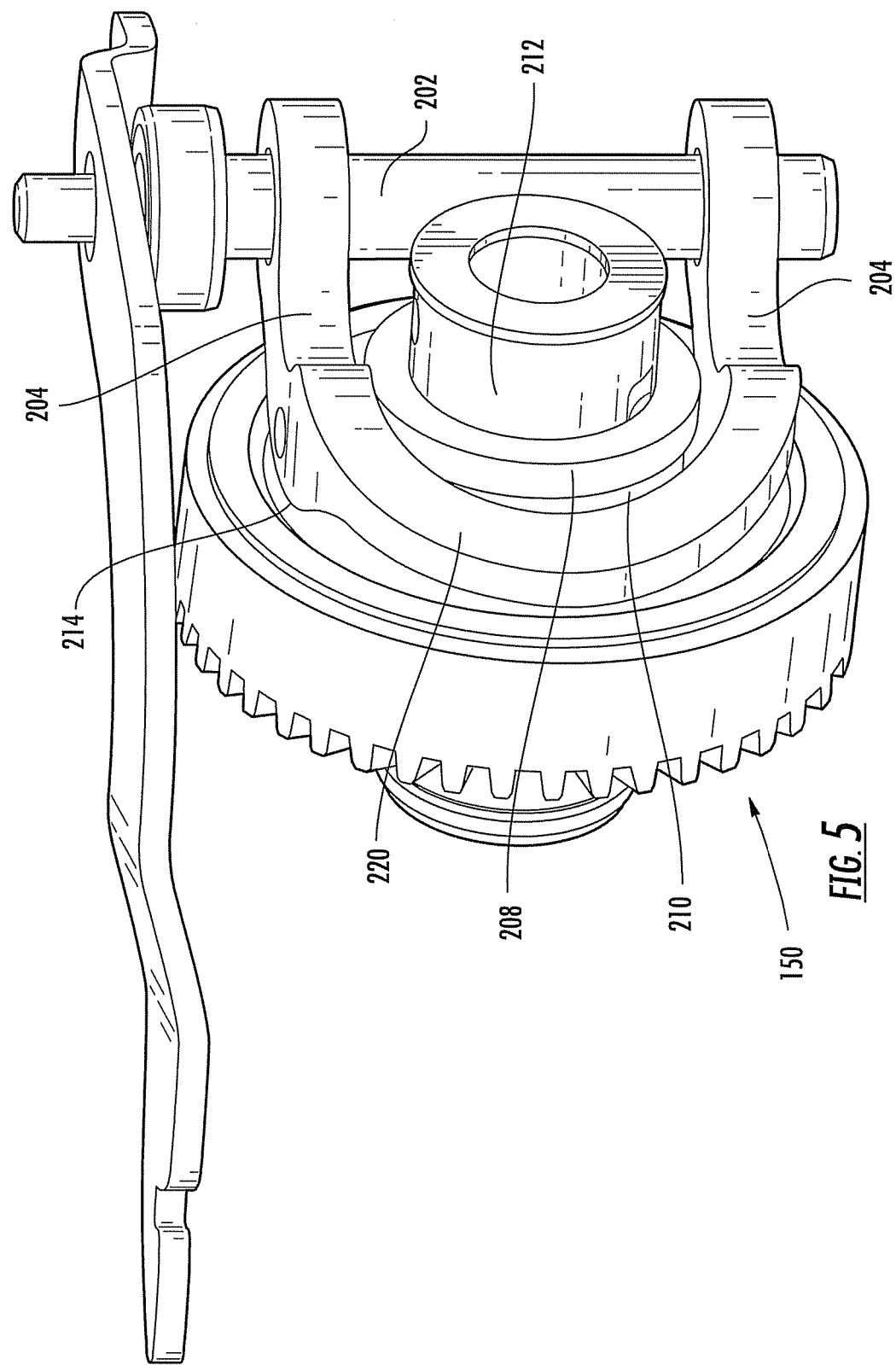
FIG. 5 is a perspective view of a clutch linkage according to an embodiment of the presently disclosed subject matter connected within a clutch disengagement system.

Specifically, referring to FIGS. 3-5, a clutch linkage 200 can include a rotatable control shaft 202 mounted to the transmission housing on which two arms 204 are attached for pivoting movement with control shaft 202. Each of arms 204 can include a protrusion 206 extending from an inward-facing surface 205 of respective arm 204 (i.e., facing towards the other of arms 204). Protrusions 206 can engage a movable sleeve 208, which can for example be a clutch bearing, at substantially diametrically opposing sides of sleeve 208 to move sleeve 208 between an engaged position and a disengaged position. Specifically, for example, sleeve 208 can be a substantially cylindrical sheath that is axially translatable over the exterior surface of a cylindrical guide 212, such as an input shaft of the transmission. Sleeve 208 can include a recess into which protrusions 206 can be positioned or inserted, and the recess can for example be a groove 210 indented into the surface of sleeve 208. More specifically, groove 210 can be a circumferential groove at or about a center of sleeve 208.

In this arrangement, sleeve 208 is not fixedly fastened to arms 204, but the interconnection of protrusions 206 in groove 210 allows the movement of arms 204 to cause the axial movement of sleeve 208. As a result, when control shaft 202 is rotated, the movement of arms 204 can cause sleeve 208 to move to engage or disengage a clutch element 150. In particular, referring to FIGS. 3 and 4, protrusions 206 can have a substantially rounded shape (e.g., a cylindrical peg) such that when arms 204 are rotated, projections 206 can turn and slide within the recess in sleeve 208 (i.e., within groove 210) while the component of the force exerted by arms 204 in a direction along the axis of sleeve 208 can cause sleeve 208 to move.

Figure 6A:
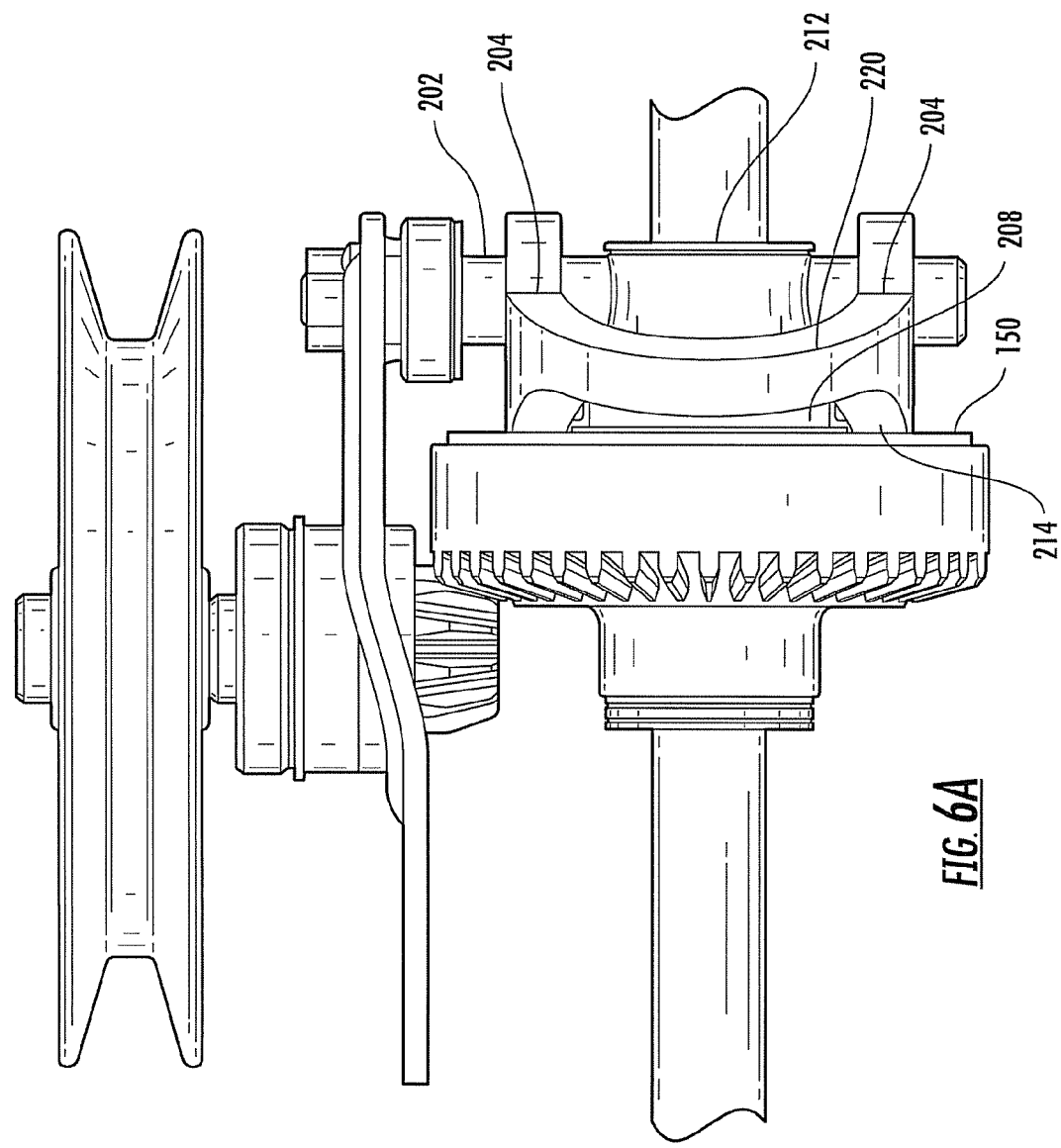
FIG. 6A is a side view of a clutch linkage according to an embodiment of the presently disclosed subject matter positioned in an engaged state.
Figure 6B:
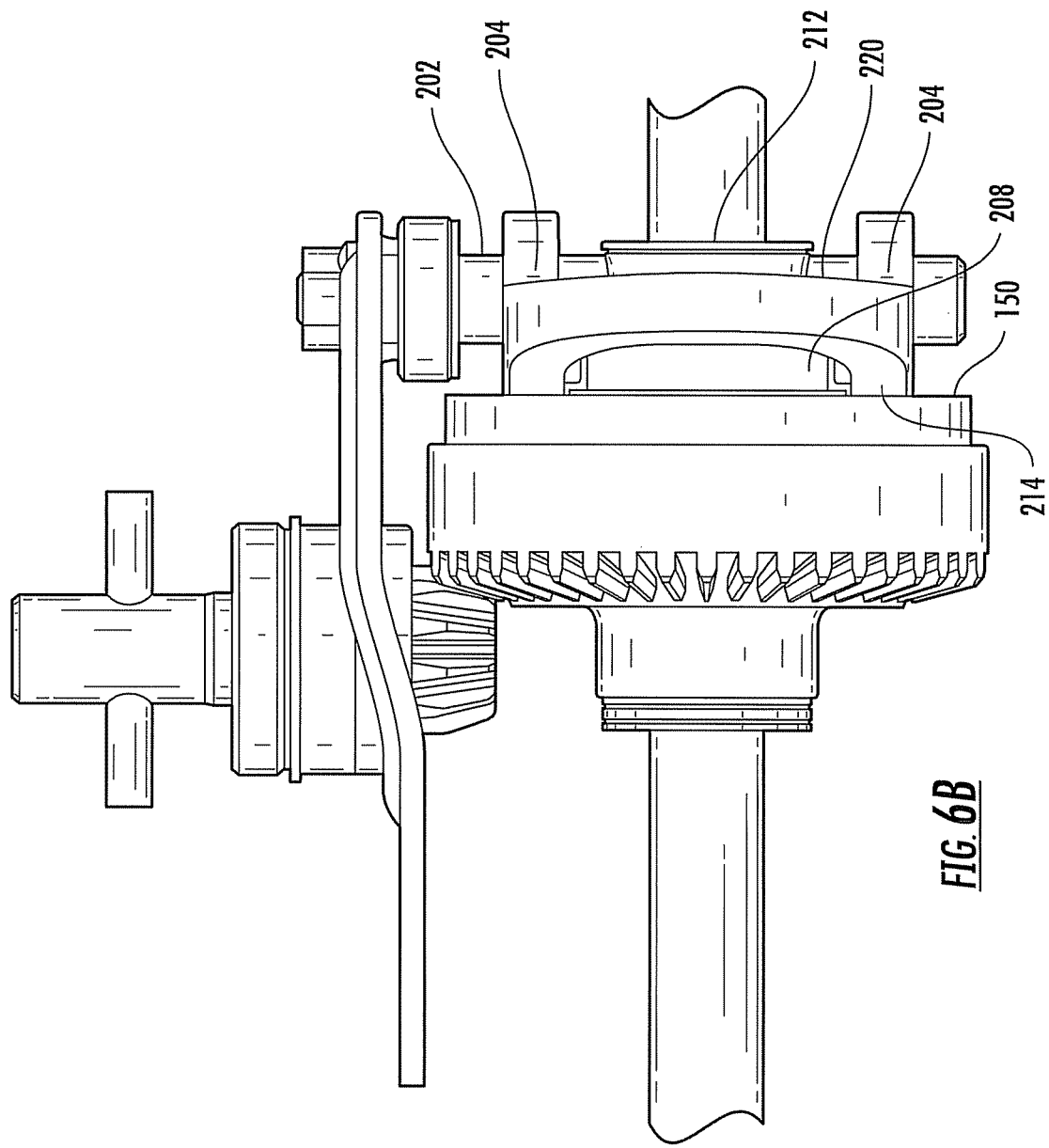
FIG. 6B is a side view of a clutch linkage according to an embodiment of the presently disclosed subject matter positioned in a disengaged state.

As a result, and as illustrated in FIGS. 5, 6A, and 6B, rotation of control shaft 202 can pivot arms 204, thereby moving sleeve 208 against clutch element 150 to engage clutch element 150 (See., e.g., FIG. 6A) or away from clutch element 150 to disengage clutch element 150 (See, e.g., FIG. 6B). As noted above, clutch element 150 can be a pressure plate of a disk clutch, and movement of sleeve 208 can deform a diaphragm spring of the clutch such that pressure plates are engaged with corresponding friction linings on the clutch disk. Of course, clutch linkage 200 can be incorporated into any kind of clutch in which the translation of an element such as sleeve 208 can alternately engage or disengage an adjacent clutch element 150. In this way, clutch linkage 200 can push and pull clutch element 150 to engage and disengage the transmission.

In addition, each of arms 204 can further include a shoulder 214 that can protrude toward clutch element 150 when clutch linkage 200 is installed. When control shaft 202 is rotated, shoulders 214 can exert a force against clutch element 150 to engage clutch element 150 (See., e.g., FIG. 6A). In this way, the engagement of clutch element 150 can be caused directly by the movement of arms 204 rather than the movement of sleeve 208. Disengagement of clutch element 150 can still be achieved by moving arms 204 to cause sleeve 208 to move away from clutch element 150.

Further, in contrast to typical clutch arrangements, clutch linkage 200 can also include a cross-bar element 220 that connects arms 204 together in an integral manner. As a result, arms 204 are movable together as a unit. Cross-bar 220 can extend between distal ends of arms 204 (i.e., ends opposite the ends connected to control shaft 202), or cross-bar 220 can be connected between arms 204 at any point along their lengths. As shown for example in FIGS. 3 and 5, cross-bar 220 can have a substantially semi-circular shape. This shape can ensure that cross-bar 220 does not require much open space around the installation of clutch linkage 200. In addition, arms 204 can each have a curved shape such that the point on arms 204 at which cross-bar 220 is connected is offset relative to the position of projections 206, as shown in FIG. 4. This shape can further ensure that the shape of clutch linkage 200 closely traces any adjacent structures within the clutch release device (e.g., clutch element 150) so as to be as compact as possible.

Cross-bar 220 can provide a second common line of connection for arms 204 (the first being the axis of control shaft 202 about which arms 204 can be pivoted) so that protrusions 206 on arms 204 are aligned and maintained in the same plane parallel with the axis about which arms 204 can be pivoted. In this way, rather than arms 204 being independently mounted on control shaft 202, the positions of arms 204 are tied together. As a result, problems with manufacturing tolerances and the precision of assembly and installation of the components are less likely to cause the operation problems noted above.

Figure 1:
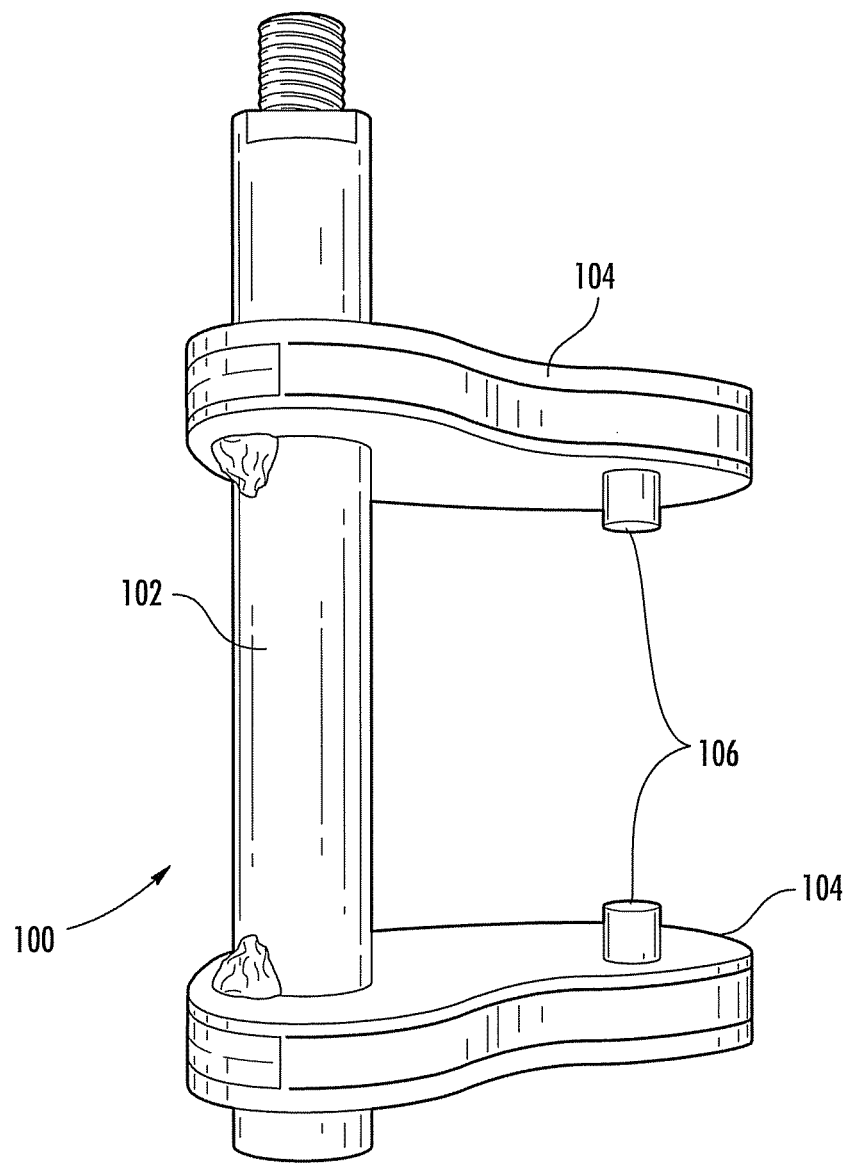
FIG. 1 is a top view of a prior art clutch linkage according to a typical configuration in a clutch engagement/disengagement system.
Figure 2:
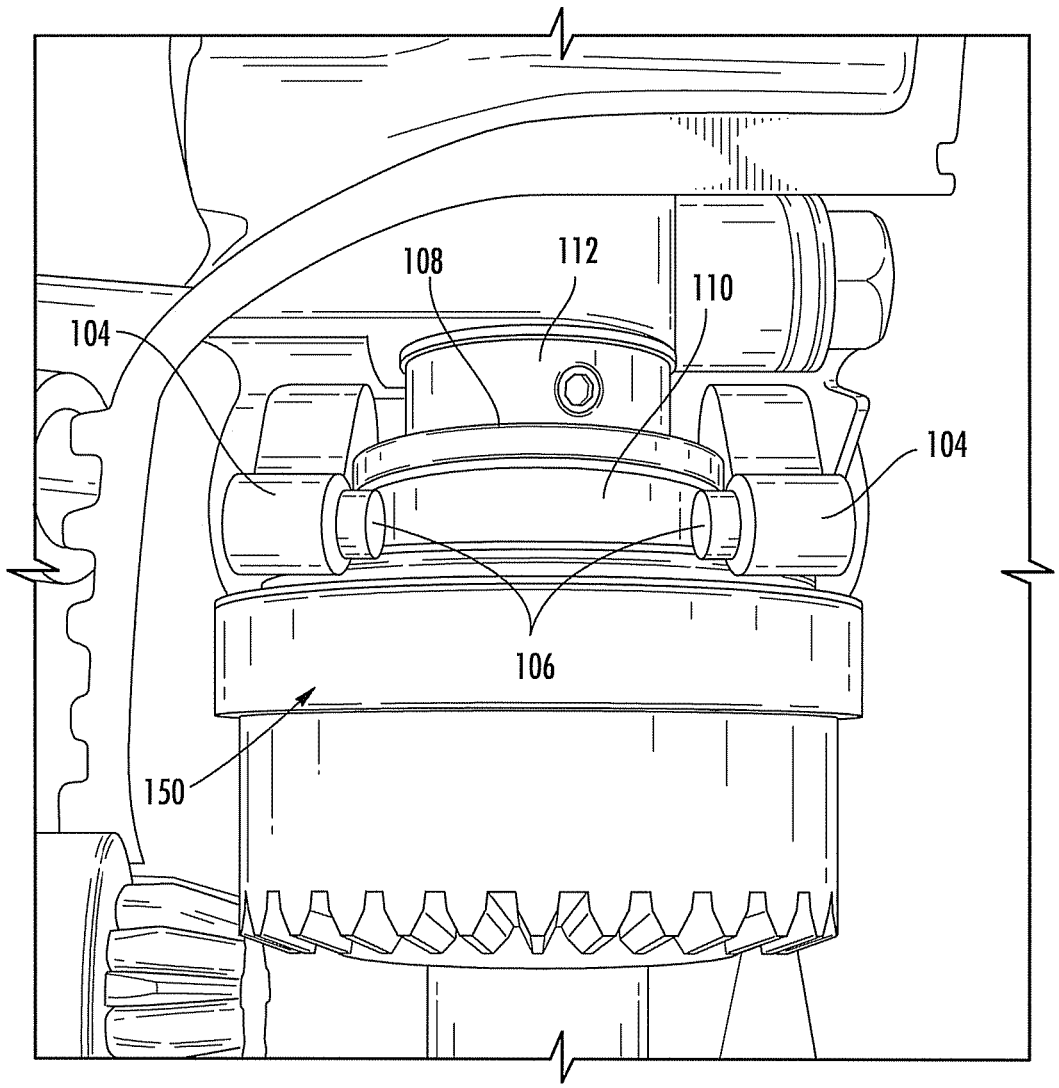
FIG. 2 is a front-side view of a prior art clutch linkage connected within a clutch engagement/disengagement system according to a typical configuration in a clutch engagement/disengagement system.

Further, arms 204 and cross-bar 220 can be formed as a single component. Therefore, rather than clutch linkage 200 being composed of three separate components (e.g., control shaft 102 and two arms 104 of the prior art clutch linkage 100 shown in FIGS. 1 and 2), only two components need to be machined and installed. In this configuration, arms 204 and cross-bar 220 define a single substantially U-shaped arm connected at two points to pivotable control shaft 202, the single arm being movable to engage sleeve 208 for axial movement of sleeve 208 into and out of engagement with clutch element 150. Accordingly, the initial cost of manufacture and the time and complexity of the installation of clutch linkage 200 can all be reduced.

The present subject matter can be embodied in other forms without departure from the spirit and essential characteristics thereof. The embodiments described therefore are to be considered in all respects as illustrative and not restrictive. Although the present subject matter has been described in terms of certain preferred embodiments, other embodiments that are apparent to those of ordinary skill in the art are also within the scope of the present subject matter.

What is claimed is:

1. A clutch linkage for a variable speed transmission comprising:
   a control shaft pivotable about an axis of the control shaft;
   two arms connected to the control shaft, each of the arms being pivotable with the control shaft about the axis between a first position and a second position in response to pivoting of the control shaft;
   a cross-bar connecting the two arms;
   a projection positioned on each of the arms between the control shaft and the cross-bar, each projection being configured for exerting a force on a movable sleeve when the two arms are moved between the first position and the second position, the movable sleeve being movable between a disengaged position away from a clutch element and an engaged position against the clutch element; and
   at least one shoulder on the two arms, the at least one shoulder being configured to move into contact with and exert a force on the clutch element when the two arms are moved between the first position and the second position.

2. A clutch linkage for a variable speed transmission comprising:
a control shaft pivotable about an axis of the control shaft;
a substantially U-shaped arm connected at two points to the control shaft, the substantially U-shaped arm comprising a first pivotable arm connected to the control shaft at a first end of the first pivotable arm, a second pivotable arm connected to the control shaft at a first end of the second pivotable arm, and a cross-bar extending between the first pivotable arm and the second pivotable arm whereby the first and second pivotable arms are integrally connected and moveable, the substantially U-shaped arm being pivotable with the control shaft about the axis between a first position and a second position in response to pivoting of the control shaft; and
a plurality of projections positioned on the substantially U-shaped arm between the control shaft and the cross-bar, the plurality of projections being configured for exerting a force on a movable sleeve when the substantially U-shaped arm is moved between the first position and the second position, the movable sleeve being movable between a disengaged position away from a clutch element and an engaged position against the clutch element;
wherein the substantially U-shaped arm comprises at least one shoulder, the at least one shoulder being configured to move into contact with and exert a force on the clutch element when the substantially U-shaped arm is moved between the first position and the second position.

3. The clutch linkage of claim 2, wherein the cross-bar is connected to and extends from the first pivotable arm at a second end of the first pivotable arm opposite the first end of the first pivotable arm connected to the control shaft; and
wherein the cross-bar is connected to and extends from the second pivotable arm at a second end of the second pivotable arm opposite the first end of the second pivotable arm connected to the control shaft.

4. The clutch linkage of claim 3, wherein the cross-bar is substantially U-shaped.

5. The clutch linkage of claim 2, wherein the plurality of projections comprises a first projection extending from an interior-facing surface of the first pivotable arm and a second projection extending from an interior-facing surface of the second pivotable arm.

6. The clutch linkage of claim 5, wherein the second projection is positioned substantially diametrically opposite to the first projection.

7. The clutch linkage of claim 5, wherein the first pivotable arm has a curved shape such that a position at which the cross-bar is connected to the first pivotable arm is offset such that it is non-collinear relative to a position at which first end of the first pivotable arm is connected to the control shaft and a position from which the first projection extends; and
wherein the second pivotable arm has a curved shape such that a position at which the cross-bar is connected to the second pivotable arm is offset such that it is non-collinear relative to a position at which first end of the second pivotable arm is connected to the control shaft and a position from which the second projection extends.

8. The clutch linkage of claim 2, wherein each of the plurality of projections comprises a substantially cylindrical protrusion.

9. A clutch release device for a variable speed transmission comprising:
a sleeve movable between a disengaged position away from a clutch element and an engaged position against the clutch element;
a control shaft pivotable about an axis of the control shaft;
a substantially U-shaped arm positioned about the sleeve and connected at two points to the control shaft, the substantially U-shaped arm comprising a first pivotable arm connected at a first end of the first pivotable arm to the control shaft, a second pivotable arm connected at a first end of the second pivotable arm to the control shaft, a cross-bar extending between the first pivotable arm and the second pivotable arm, and at least one shoulder facing the clutch element; and
a plurality of projections positioned on the substantially U-shaped arm between the control shaft and the cross-bar, the projections linking the substantially U-shaped arm to the sleeve;
wherein rotation of the control shaft about the axis pivots the substantially U-shaped arm about the axis between a first position and a second position, which in turn moves the sleeve between the disengaged position and the engaged position; and
wherein when the control shaft is rotated about the axis to move the substantially U-shaped arm between a first position and a second position, the at least one shoulder is moved into contact with and exerts a force on the clutch element.

10. The clutch release device of claim 9, wherein the sleeve comprises a recess into which the plurality of projections is received.

11. The clutch release device of claim 10, wherein the recess comprises a circumferential groove.

12. The clutch release device of claim 9, wherein the cross-bar is connected to the first pivotable arm at a second end of the first pivotable arm opposite the first end of the first pivotable arm connected to the control shaft; and
wherein the cross-bar is connected to the second pivotable arm at a second end of the second pivotable arm opposite the first end of the second pivotable arm connected to the control shaft.

13. The clutch release device of claim 12, wherein the cross-bar is substantially U-shaped.

14. The clutch release device of claim 9, wherein the plurality of projections comprises a first projection and a second projection positioned on the substantially U-shaped arm such that they engage the sleeve at substantially diametrically opposite positions on the sleeve.

15. The clutch release device of claim 14, wherein the first pivotable arm has a curved shape such that a position at which the cross-bar is connected to the first pivotable arm is offset such that it is non-collinear relative to a position at which first end of the first pivotable arm is connected to the control shaft and a position from which the first projection extends; and
wherein the second pivotable arm has a curved shape such that a position at which the cross-bar is connected to the second pivotable arm is offset such that it is non-collinear relative to a position at which first end of the second pivotable arm is connected to the control shaft and a position from which the second projection extends.

16. The clutch release device of claim 9, wherein each of the plurality of projections comprises a substantially cylindrical protrusion.

17. The clutch release device of claim 9, wherein the movable sleeve comprises a clutch bearing.

\* \* \* \* \*